US009484121B2

(12) United States Patent
Shinnar et al.

(10) Patent No.: US 9,484,121 B2
(45) Date of Patent: Nov. 1, 2016

(54) SYSTEM AND METHOD FOR STORING ENERGY IN A NUCLEAR POWER PLANT

(71) Applicants: Shlomo Shinnar, Great Neck, NY (US); Meir Shinnar, Great Neck, NY (US)

(72) Inventors: Reuel Shinnar, Great Neck, NY (US); Robert L. Hirsch, Alexandria, VA (US)

(73) Assignee: The Research Foundation of the City University of New York, New York, NY (US)

( * ) Notice: Subject to any disclaimer, the term of this patent is extended or adjusted under 35 U.S.C. 154(b) by 278 days.

(21) Appl. No.: 14/256,461

(22) Filed: Apr. 18, 2014

(65) Prior Publication Data

US 2014/0334593 A1    Nov. 13, 2014

Related U.S. Application Data

(62) Division of application No. 12/376,064, filed as application No. PCT/US2007/074647 on Jul. 27, 2007, now Pat. No. 8,724,768.

(60) Provisional application No. 60/834,736, filed on Aug. 1, 2006.

(51) Int. Cl.
*G21C 19/28* (2006.01)
*G21D 1/02* (2006.01)
(Continued)

(52) U.S. Cl.
CPC ............... *G21C 19/28* (2013.01); *F01K 3/00* (2013.01); *F22B 1/1823* (2013.01); *G21D 1/00* (2013.01); *G21D 1/006* (2013.01); *Y02E 30/40* (2013.01)

(58) Field of Classification Search
CPC ........ G21C 19/28; G21D 1/00; G21D 1/006; G21D 1/02; F01K 3/00; F01K 3/004; F01K 3/08; F01K 3/12; F01K 3/18; F01K 3/181; F01K 3/26; F22B 1/02; F22B 1/18; F22B 1/1823; Y02E 30/30; Y02E 30/40
USPC ........ 376/207, 210, 211, 347, 361, 383–405, 376/317, 322; 392/339, 341; 165/4, 10, 165/110, 111, 144, 145; 126/99 R, 400; 290/2; 60/643, 659
See application file for complete search history.

(56) References Cited

U.S. PATENT DOCUMENTS 2,748,710 A * 6/1956 Vandenberg .................. 376/402
2,856,506 A * 10/1958 Telkes .......................... 126/99 R
(Continued)

FOREIGN PATENT DOCUMENTS

FR             2325882 A1 * 4/1977
WO       WO96/21706 A1 * 7/1996
WO PCT/DE2006/000018    * 7/2006

*Primary Examiner* — Bernarr Gregory
(74) *Attorney, Agent, or Firm* — Burns & Levinson LLP; Orlando Lopez

(57) ABSTRACT

A method for storing the energy of a nuclear power plant in which the nuclear core is cooled by gases or liquid heat transfer media. The hot heat transfer liquid is stored directly in storage tanks. When needed, it is used for heating a power plant. The heat of a compressed gas heat transfer medium such as helium is stored by passing the compressed gas through tanks filled with heat-resistant solids and recovered by passing the same type of gas in a second circuit in a reverse direction. Through the hot tanks to the power plant and back. This Abstract is not intended to define the invention disclosed in the specification, nor intended to limit the scope of the invention in any way.

19 Claims, 1 Drawing Sheet

High Temperature Nuclear Reactor with Storage Capability.
Schematic Description.

(51) Int. Cl.
 *F01K 3/00* (2006.01)
 *G21D 1/00* (2006.01)
 *F22B 1/18* (2006.01)
 *G21C 19/00* (2006.01)

(56) References Cited

U.S. PATENT DOCUMENTS

| | | | | |
|---|---|---|---|---|
| 3,117,625 A | * | 1/1964 | Fraenkel | 376/402 |
| 3,765,477 A | | 10/1973 | Van Huisen | |
| 3,848,416 A | | 11/1974 | Bundy | |
| 3,851,495 A | | 12/1974 | Lahoud et al. | |
| 3,894,394 A | | 7/1975 | Braytenbah et al. | |
| 3,998,695 A | * | 12/1976 | Cahn et al. | 376/402 |
| 4,003,786 A | * | 1/1977 | Cahn | 376/402 |
| 4,085,333 A | * | 4/1978 | Grise et al. | 290/2 |
| 4,089,744 A | * | 5/1978 | Cahn | 376/402 |
| 4,102,741 A | | 7/1978 | Cahn | |
| 4,150,546 A | | 4/1979 | Collett | |
| 4,159,736 A | | 7/1979 | Denis et al. | |
| 4,164,253 A | * | 8/1979 | Skala | 126/400 |
| 4,222,365 A | * | 9/1980 | Thomson | F01K 3/00 126/400 |
| 4,246,069 A | | 1/1981 | Dupuy et al. | |
| 4,263,961 A | * | 4/1981 | Morawetz et al. | 165/111 |
| 4,286,141 A | * | 8/1981 | MacCracken | 165/10 |
| 4,294,311 A | | 10/1981 | Denis et al. | |
| 4,343,763 A | * | 8/1982 | McGuire | 376/402 |
| 4,362,149 A | * | 12/1982 | Thomson | F01K 3/00 126/400 |
| 4,399,656 A | | 8/1983 | Laing et al. | |
| 4,404,165 A | | 9/1983 | Hesky et al. | |
| 4,479,353 A | * | 10/1984 | Schluderberg | F01K 3/00 165/145 |
| 5,590,705 A | * | 1/1997 | Chevalier et al. | 165/10 |
| 6,047,105 A | * | 4/2000 | Lentz | 392/341 |
| 8,724,768 B2 | * | 5/2014 | Shinnar | F01K 3/00 376/317 |
| 2003/0112919 A1 | | 6/2003 | Davies | |
| 2004/0042579 A1 | | 3/2004 | Bolton et al. | |
| 2005/0013402 A1 | | 1/2005 | Kriel | |

* cited by examiner

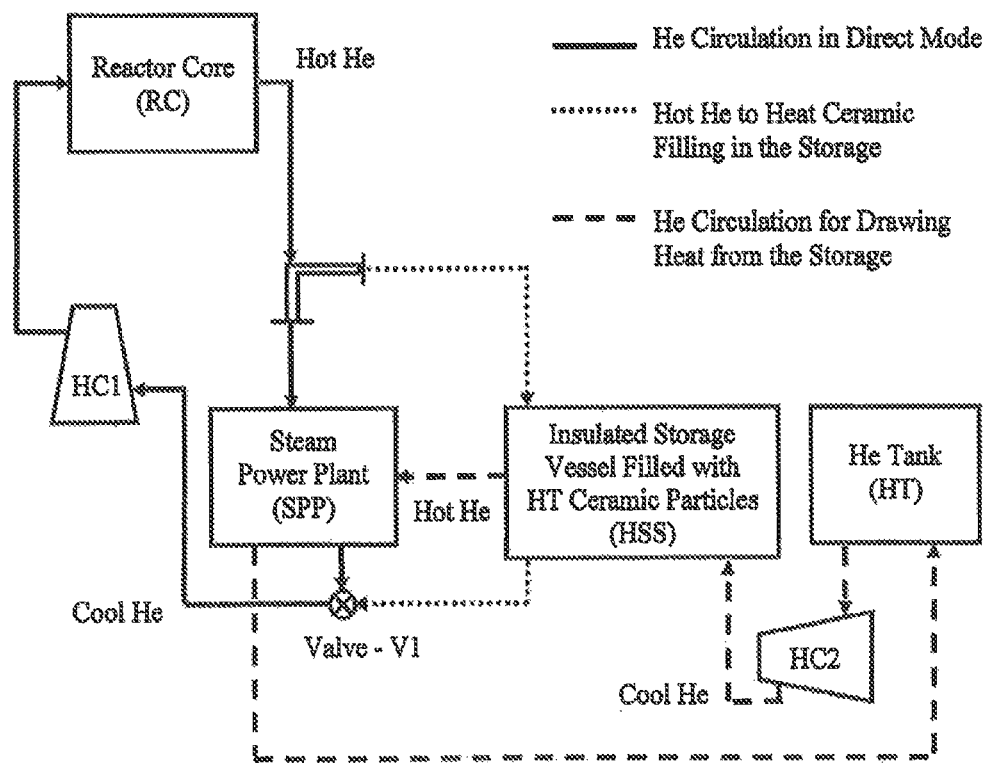
High Temperature Nuclear Reactor with Storage Capability.
Schematic Description.

SYSTEM AND METHOD FOR STORING ENERGY IN A NUCLEAR POWER PLANT

CROSS-REFERENCE TO RELATED APPLICATIONS

The present application is a division of U.S. application Ser. No. 12/376,064, filed Feb. 2, 2009, now U.S. Pat. No. 8,724,768, which in turn is a U.S. national stage application under 35 U.S.C. 371 of International Application No. PCT/US07/74647 filed Jul. 27, 2007 and entitled SYSTEM AND METHOD FOR STORING ENERGY IN A NUCLEAR POWER PLANT, which in turn claims the benefit of U.S. Provisional Patent Application No. 60/834,736, filed on Aug. 1, 2006, under 35 U.S.C. §119(e), the disclosures of which are expressly incorporated by reference herein in their entirety for all purposes.

BACKGROUND OF THE INVENTION

1. Field of the Invention

The invention relates a system and method of equipping specific types of nuclear power plants with low cost storage that has a very high thermal efficiency.

The invention also relates to systems and methods for operating nuclear reactors cost-effectively at maximum capacity so that nuclear plants will be able to compete with conventional fossil fueled power plants in their responsiveness to load changes over a wide range.

The invention also relates to a storage system and method for a high-temperature gas-cooled nuclear reactor wherein the storage system or the method has a high efficiency (over 90%) and a low cost, allowing the nuclear reactor to always operate at maximum reactor power, while remaining capable of varying its electrical output as does a steam power plant.

2. Discussion of Background Information

Nuclear reactors have a large thermal inertia, which slows their responsiveness to variations in the demand for power from the grid. Their potential to become the major source of electricity is seriously affected by this limitation. Additionally, the initial cost of investment in a nuclear power plant is high; therefore, they must be built to operate at full capacity as it is too costly to operate them at low loads. Commercial nuclear reactors are kept operating full time to ensure a profitable return on the original investment, therefore, most nuclear reactors are designed for base load. Operating them at or below half-capacity is not economically attractive since halving the load nearly doubles the cost per KWh. Another limitation on their functionality is that due to their thermal inertia, nuclear reactors can have a slow transient response.

As currently designed, nuclear power plants are unable to follow the variable demands of the grid because they are expensive to operate at intermediate loads and unsuitable for rapid load following. Because they are used mostly for base power, the total contribution they can make to the grid is thereby limited. Sixty percent of the demand for electricity is for variable, controllable power. At present, this need is supplied by coal-fired steam and gas turbine power plants and to some extent by hydroelectric power. While coal-fired steam power plants can respond to load changes quickly and can operate well with a load of only 13% of design capacity, they are more expensive to use for generating electricity during periods of partial load as they must be designed for maximum capacity.

Various energy storage devices have been proposed to solve this problem, but all of these proposals have limited efficiency (about 75%) and are expensive. Furthermore, while storage systems have been proposed for solar thermal power plants (see Sargent & Lundy, "*Assessment of Parabolic Trough and Power Tower Solar Technology Cost and Performance Forecasts*", SL-5641, (2002), the disclosure of which is hereby expressly incorporated by reference in its entirety), they are based on liquid heat transfer fluids and molten salts, which may be unsuitable for nuclear reactors. The system described therein uses hundreds to thousands of sun-tracking mirrors called heliostats to reflect the incident sunlight onto the receiver. These plants are best suited for utility-scale applications in the 30- to 400-MWe ranges. In a molten-salt solar power tower, liquid salt at 290° C. (554° F.) is pumped from a "cold" storage tank through the receiver where it is heated to 565° C. (1,049° F.) and then on to a "hot" tank for storage. When power is needed from the plant, hot salt is pumped to a steam generating system that produces superheated steam for a conventional Rankine-cycle turbine/generator system.

Consider, for example, a high temperature nuclear reactor cooled by helium (He) or any intermediate heat transfer medium (see Baxi, C. B., et al.; "*Evolution of the Power Conversion Unit Design of the GT-MHR*", presented at the International Congress on Advances in Nuclear Power Plants, (2006), the website the entry for Pebble Bed Reactor on Wikipedia and Penner, S, S.; Seiser, R. Schultz, K.; "Nuclear Energy for the Future", Presented at the Meeting of the Doctors for Disaster Preparedness, Las Vegas Nev., 16-17 Jul. 2005, the disclosures of which are hereby expressly incorporated by reference in their entireties).

The invention solves one or more of the problems associated with conventional nuclear power plants, is simple in design, is more robust, is cheaper and lacks one or more of the disadvantages of conventional nuclear power plants.

SUMMARY OF THE INVENTION

The invention provides for a system and method for equipping specific types of nuclear power plants with low cost storage that has a very high thermal efficiency. As a result of the invention, nuclear reactors will be able to operate cost-effectively at maximum capacity and will be able to compete with conventional fossil fueled power plants in their responsiveness to load changes over a wide range.

The system and method can utilize a high temperature heat transfer medium, e.g., hot helium (He), and can be used to provide heat for a steam power plant. A steam power plant can, in particular, be used as it has a high turndown ratio and provides a fast response. Of course, any device that can use heat to generate electricity may be substituted. To increase its suitability for variable operation, the size of the steam power plant can be enlarged to several times that of the nuclear reactor without increasing the size of the nuclear reactor itself.

The invention also provides for a process for operating a nuclear reactor with a capability to store energy and deliver electricity when needed. The process comprises removing heat from a core of a nuclear reactor by a circulating liquid or gaseous heat transfer medium. The method also includes transferring the heat transfer medium at least one of directly to a power generating device capable of load following and to a storage system. Additionally, the process includes storing either the heat transfer medium or its heat in a storage system and delivering the either the stored heat transfer medium or its heat to the power-generating device when needed.

The heat transfer medium may be a compressed gas. The compressed gas may be helium. The heat storage system may comprise a set of tanks or a set of pipes containing or filled with high temperature resistant solids through which hot gas from the nuclear reactor is passed in one direction heating up the filling and leaving a section of the end cooled such that the gas exits the tank at a low temperature to be recycled to the reactor core leaving a small section cold, and the storage circuit is either switched to another cold tank or stopped. The hot tank may remain hot as a storage medium until the heat is needed, wherein when the heat is needed, a second stream of the same compressed gas is passed in a counter current way to be heated in order to be fed to the power generating device and in a closed circuit recycled to the storage and back to the power generating device until only a small section remains hot to insure constant temperature of the hot gas delivered to the power generating device.

The heat storage system may comprise a storage vessel configured such that heat is absorbed in a way that it spreads through the tank in a relatively sharp front, and preferably less wide than one tenth of the length of the vessel. The storage vessel may be similar to the design of a recuperative heat exchanger with the main difference being that in a recuperative heat exchanger the cycles are short and of similar duration and the counter current streams have similar velocities whereas when used for storage, whereby heating occurs whenever heat is available, and the heat recovery whenever needed to supply the variable load and the counter current streams may have totally different velocities. The power-generating device may be a steam power plant or a gas turbine. The heat transfer medium may be a liquid. The liquid may comprise one of a molten salt and a molten metal.

The gas may be compressed and the heat exchanged with a gas of the same composition but at lower pressure, which is used in separate circuits to deposit the heat in the storage tank and to recover it when needed to the power-generating device. The lower pressure may comprise about 3 atm to about 30 atm.

The process may further comprise storing hot liquid in one insulated tank, transferring it when not needed for power generation to a storage vessel, and when needed using it to provide heat to the power generating device preferably a steam power plant and the cooled liquid to a cold storage tank and when needed back to the reactor core.

The process may be capable of providing fast load following whenever needed by using sufficient storage and a steam power plant is configured for a high turndown ratio and fast response. The power-generating device may be capable of meeting a maximum variable load expected even when the load is larger than the rated capacity of the nuclear power plant, whereby the nuclear power plant is able to achieve a large capacity for short times using the stored heat.

The invention also provides for a system for storing heat in a nuclear power plant, wherein the system comprises at least one tank comprising solid media structured and arranged to store heat. The system is structured and arranged to pass a first fluid through at least one tank, transfer heat from the first fluid to the solid media, store the heat in the solid media, and transfer the heat from the solid media to a second fluid.

The first fluid may comprise a compressed gas. The compressed gas may comprise helium. The second fluid may comprise a compressed gas. At least one of the first and second fluids may comprise a compressed gas having a high pressure. The first fluid may comprise a compressed gas moving a predetermined velocity. The first fluid may be higher in temperature than the second fluid. The first fluid may pass through at least one device heated by nuclear fission before entering the at least one tank. The second fluid may be used to produce steam in a power plant before entering the at least one tank. The first fluid may comprise a compressed gas passing through at least one nuclear reactor core. The second fluid may comprise a compressed gas passing through a power plant generating electrical power.

The system may further comprise a control system controlling at least one of: when the first fluid is allowed to pass through the at least one tank and when the second fluid is allowed to pass through the at least one tank.

The system may further comprise a control system controlling at least one of: when the first fluid is allowed to pass through the at least one tank, when the first fluid is allowed to bypass the at least one tank, when the second fluid is allowed to pass through the at least one tank, and when the second fluid is allowed to bypass the at least one tank.

The solid media may comprise at least one of: alumina; silica; quartz; ceramic; pebbles made of at least one of alumina, silica, quartz, and ceramic; high conductivity and high temperature resistant particles; at least one packed bed of at least one of particles and pebbles; and at least one packed bed of solids. The system may be structured and arranged to move at least one of the first and second fluids through the at least one tank with at least one of uniform flow distribution and minimal pressure drops.

The system may further comprise at least one nuclear reactor core heating the first fluid before the first fluid enters the at least one tank and a steam power plant receiving the heated fluid from the at least one nuclear reactor core under certain conditions and receiving the second fluid from the at least one tank under certain other conditions.

The system may further comprise one or more valves controlling movement of the first and second fluids between the at least one nuclear reactor core, the at least one tank, and the steam power plant and one or more recycle compressors pressurizing the first and second fluids.

The first and the second fluid may comprise helium. The first and second fluids may comprise portions of the same compressed gas flowing in a closed system, wherein the portions have different temperatures when entering the at least one tank. The first fluid may comprise a fluid heated by at least one reactor core before entering the at least one tank and the second fluid comprises a fluid exiting a power plant before entering the at least one tank. The system may have the following three cycles; a first cycle wherein the first fluid bypasses the at least one tank, flows to a power plant, and returns to at least one reactor core, a second cycle wherein at least a portion of the first fluid flows through the at least one tank and returns to the at least one reactor core, and a third cycle wherein the second fluid passes through the at least one tank, flows to a power plant, and returns to the at least one tank.

The invention also provides for a system for producing electrical energy comprising at least one tank comprising solid media structured and arranged to store heat, at least one reactor core heating a first fluid before the first fluid enters the at least one tank, and a power plant receiving the heated fluid from the at least one reactor core under certain conditions and receiving a second fluid from the at least one tank under certain other conditions. The system is structured and arranged to pass the first fluid through the at least one tank, transfer heat from the first fluid to the solid media, store the heat in the solid media, and transfer the heat from the solid media to the second fluid.

The system may further comprise one or more valves controlling movement of the first and second fluids between the at least one reactor core, the at least one tank, and the power plant, one or more recycle compressors pressurizing the first and second fluids, and a control system controlling at least one of: when the first fluid is allowed to pass through the at least one tank, when the first fluid is allowed to bypass the at least one tank and pass through the power plant, when the second fluid is allowed to pass through the at least one tank, and when the second fluid is allowed to bypass the at least one tank and enter the at least one reactor core.

The system may have three cycles which include: a first cycle wherein the first fluid bypasses the at least one tank, flows to the power plant, and returns to the at least one reactor core, a second cycle wherein at least a portion of the first fluid flows through the at least one tank and returns to the at least one reactor core, and a third cycle wherein the second fluid passes through the at least one tank, flows to the power plant, and returns to the at least one tank.

The invention also provides for a method of storing heat comprising moving a portion of heated fluid from at least one reactor core to at least one tank comprising solid media structured and arranged to store heat and transferring the stored heat from the solid media to a fluid that can be used by a power plant to generate electrical energy.

The heated fluid and the fluid may comprise a compressed gas. The compressed gas may comprise helium. The method may further comprise pressurizing at least one of the heated fluid and the fluid to a high pressure.

The invention also provides for a process for providing a nuclear reactor with a capability to store energy and deliver electricity when needed, wherein the process comprises removing heat from a core of a nuclear reactor by a circulating liquid or gaseous heat transfer medium, transferring the hot heat transfer medium when needed directly to a power generating device capable of load following, and when needed to a storage system, and storing either the heat transfer fluid or its heat in a storage system capable of storing either the heat transfer medium or its heat and capable of delivering the either the heat transfer medium or its heat to the power-generating device when needed.

The heat transfer medium may be a compressed gas. The compressed gas may be helium. The heat storage system may comprise a set of tanks or a set of pipes containing or filled with high temperature resistant solids through which hot gas from the nuclear reactor is passed in one direction heating up the filling and leaving a section of the end cooled such that the gas exits the tank at a low temperature to be recycled to the reactor core leaving a small section cold, and the storage circuit is either switched to another cold tank or stopped. The hot tank may remain hot as a storage medium until the heat is needed, wherein when the heat is needed, a second stream of the same compressed gas is passed in a counter current way to be heated in order to be fed to the power generating device and in a closed circuit recycled to the storage and back to the power generating device until only a small section remains hot to insure constant temperature of the hot gas delivered to the power generating device.

The heat storage system may comprise a storage vessel configured such that heat is absorbed in a way that it spreads through the tank in a relatively sharp front, and preferably less wide than one tenth of the length of the vessel. The storage vessel may be similar to the design of a recuperative heat exchanger with the main difference being that in a recuperative heat exchanger the cycles are short and of similar duration and the counter current streams have similar velocities whereas when used for storage, whereby heating occurs whenever heat is available, and the heat recovery whenever needed to supply the variable load and the counter current streams may have totally different velocities. The gas may be compressed and the heat exchanged with a gas of the same composition but at lower pressure, which is used in separate circuits to deposit the heat in the storage tank and to recover it when needed to the power-generating device. The lower pressure may comprise about 3 atm to about 30 atm. The power-generating device may be a steam power plant, or a gas turbine or, a combination of both. At least one power-producing device may comprise a gas turbine is utilized. The heat transfer medium may be a liquid. The liquid may comprise one of a molten salt and a molten metal.

The process may further comprise storing hot metal in one insulated tank, transferring it when not needed for power generation to a storage vessel, and when needed using it to provide heat to the power generating device preferably a steam power plant and the cooled liquid to a cold storage tank and when needed back to the reactor core.

The process may be capable of providing fast load following whenever needed by using sufficient storage and a steam power plant configured for a high turndown ratio and fast response.

The power-generating device may be capable of meeting a maximum variable load expected even when the load is larger than the rated capacity of the nuclear power plant, whereby the nuclear power plant is able to achieve a large capacity for short times using the stored heat.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 schematically shows one non-limiting embodiment of a high temperature nuclear reactor with storage capability.

DETAILED DESCRIPTION OF THE INVENTION

FIG. 1 provides a schematic of one non-limiting embodiment of the invention. The system utilizes a nuclear reactor or reactor core RC, a distribution valve system DV, a first helium compressor MCI, a steam power plant SPP, a heat storage system HSS, a helium tank HT, a second helium compressor HC2, as well as one or more valves V, and conduits, e.g., pipes, for moving the helium through the system. The solid-line (cycle 1) indicates a flow of He between the reactor core RC, distribution valve DV, the steam power plant SPP, the valve V and the first compressor HC1, and then back to the reactor core RC. The dotted-line (cycle 2) indicates a flow of He between the reactor core RC, through the distribution valve DV, through the heat storage system HSS, valve V, and compressor HC1, and then back to the reactor core RC. The dashed-line (cycle 3) indicates a flow of He from the steam power plant SPP, to the helium tank HT, through the second compressor HC2, to the heat storage system HSS, and then to the steam power plant SPP.

As is apparent from the FIG. 1, the invention provides for removing and storing the heat from hot He passing through one or more large storage tanks of the system HSS. The tanks can be filled with a suitable solid filling, which is resistant to (i.e., which can withstand) high temperature (e.g., pebbles or particles made from alumina, silica, quartz or ceramics) and preferably have a high heat capacity. Acceptable heat capacities (specific heat) are above 0.15 preferably above 0.2 and most preferably 0.25 and above. Heat conductivity should be above 2 W/m° K and preferably, above 5 W/m° K. An example would be alumina balls (specific heat 0.27, conductivity 6-20 W/m° K). To minimize both the heating time of a particle and of the total pressure drop, their size should be preferably between 1 to 20 mm and most preferably between 3 to 10 mm to get acceptable heating times and pressure drop. While there may be other materials and other geometric shapes that may be preferable, the selection of appropriate materials and shapes are left to the artisan based upon the instant invention and cost considerations.

In accordance with the features of the invention, the following example is provided to further facilitate understanding of the invention. When the full capacity of the nuclear power plant is used to meet the demand for electricity, all the He from the reactor core RC can be fed directly to the steam power plant SPP. When the demand for electricity is reduced or, when the plant SPP is to operate from storage HSS, the excess He not required in the steam plant SPP is directed or diverted to the storage tanks of the system HSS where its heat is deposited or transferred into the solid filling. Then, the cool He exits the system HSS and is fed back to the nuclear reactor RC. The storage system HSS is designed to allow the deposited heat to progress as a narrow front along the length of the tank(s). The tank(s) should be sufficiently oversized so that the cool end remains relatively cool at the end of the storage cycle. The same would apply when the flow is reversed. The hot end of the tank(s) would still stay hot until the end of the heat recovery cycle. The capacity of the tank(s) should be sufficient to accommodate the maximum volume of storage needed.

When the stored heat of the system HSS is used to raise the temperature of the He (cycle 3), the flow through the system HSS is reversed and the cold He flowing into the system HSS from the second compressor HC2 is fed to the cold end of the system HSS and exits the system HSS hot. Due to the excellent heat transfer between the gas and the solid heat storing media, there is practically no energy loss in the heat transfer. The only loss of energy is due to pressure drops through the solid media bed, and the heat loss through the walls of the system HSS. Both of these losses, however, can be minimized by taking these into account in designing the system. Here, the aim is to make energy storage of the system HSS as efficient as possible, and to do so more so than by any other available method.

When the power requirements of the system exceed normal capacity, all the He from the reactor core RC can be fed to the steam plant SPP. Additionally, pressurized He in the storage tank(s) of the system HSS is heated and also fed to the steam power plant SPP. This later flow represents a recycled counter flow through the storage tank(s) and then back to the steam plant SPP (cycle 3). The amount of gas in the He cycle 3 can be small, i.e., merely sufficient to compensate for the residence times in the reactor core RC, the power plant SPP, and the storage tank(s) of the system HSS.

The arrangement described above can be likened to a steam power plant which uses stored hot He as a fuel and which stores a supply for one day of operation (or for whatever period is desired). The steam plant can be designed to meet almost any desired delivery schedule as long as the total output per day does not exceed the total output of the nuclear reactor. Thus, for intermediate loads, one can operate the plant at double the capacity of the nuclear reactor, e.g., twelve hours each day, and store the total output during the night (directing just enough He to keep the steam power plant hot). In this case, the capacity of the steam power plant would have to be doubled.

The nuclear power plant could also be designed to supply instantaneously dispatchable electricity with a much larger electricity output than the capacity of the nuclear reactor itself for a limited period, i.e., based on demand. For example, by quadrupling the capacity of the steam power plant, one can supply instantaneously dispatchable electricity up to four times nominal capacity, as long as the total amount delivered does not reach the total capacity of the nuclear reactor for one day. To operate in variable mode, or to provide instantaneously available standby, however, the output of the steam power plant has to be kept above 13% of maximum capacity during this period. In this regard, the reactor can be shut down overnight and energy can be stored if enough heat is supplied to keep it warm.

The invention or aspects thereof can be applied to any other power generating device that can convert the energy of the hot heat transfer medium to electricity. It can be assumed, for example, that a grid will be powered by differently designed reactors; some for base power, (40% of total power requirement of the grid) and others for intermediate load activity or load following.

The invention or aspects thereof can also be applied to an HTR in which hot pressurized He (see Penner, S. S.; Seiser, R.; Schultz, K.; "Nuclear Energy for the Future", Presented at the Meeting of the Doctors for Disaster Preparedness, Las Vegas Nev., 16-17 Jul. 2005, the disclosure of which is hereby expressly incorporated by reference in its entirety). Furthermore, the invention also contemplates using another pressurized gas which is expanded in a gas turbine to generate electricity and after cooling, is re-compressed and fed back to the reactor core. Such plants can be substituted for the steam power plant in the FIG. 1. However, these other arrangements can limit the applicability of the invention to load following substantially. When used for intermediate loads, combined cycle gas turbine power plants are shut down at night and weekends and started up one hour before needed—so are the gas turbines.

As should be apparent from the FIG. 1, the invention can be used with combined cycle power plants or with any closed loop gas turbine (see, for example, "Small Nuclear Power Reactors", UIC Nuclear Issues Briefing Paper #60, June 2006, the disclosure of which is hereby expressly incorporated by reference in its entirety). These can be used for intermediate power by doubling the capacity of the gas turbine and bypassing it when not in use, storing the heat in the same way as described in the example which follows. In this case, however, fast load following over large amplitudes is no longer feasible because efficiency drops severely when operation is below 80% capacity.

The invention can be applied to any nuclear reactor in which the nuclear core is cooled by a circulating gas or liquid that can be used to heat or drive a power-generating device. A liquid heat transfer medium (of the type described in, for example, "Small Nuclear Power Reactors", UIC Nuclear Issues Briefing Paper 460, June 2006) can also be used the same way in a tank filled with an appropriate temperature-resistant filling. Alternatively, one storage tank can be used for storing hot liquid and another for cold liquid. However, a much larger inventory of liquid is required when two empty tanks are used, therefore, the system described in the instant FIG. 1 is normally preferable.

Example

Consider a 250 MW high-temperature nuclear reactor in which the reactor core RC is cooled by circulating He under pressure. According to the invention, the hot He is used to raise or produce steam in a high-pressure, high-efficiency steam power plant SPP which has a fast response, a high turndown ratio and, can operate efficiently at 13% of capacity. Then, the gas is recycled cold to the reactor core RC. If the maximum capacity of the steam power plant SPP is increased four-fold to 1000 MW, 1000 MW can be delivered for short periods, even though the heat source is sufficient for only an average load of 250 MW. For load following, the output can be varied over the entire range, 150 to 1000 MW. For supplying intermediate power, the steam power plant SPP needs to be increased to 500 MW, operating 12-13 hours a day. In addition, it is assumed that 12 hours of storage might be optimal.

Assuming also that a steam power plant SPP requires 8000 BTU/KWh, 12 times that amount or 96,000 BTU per KW capacity is required to provide 12 hours of storage; for the total plant, a storage capability of 24,000 MMBTU is required. Given that the heat resistant solid filling of the system HSS will have a specific heat $C_P$ of 0.25 and that the temperature drop of the circulating He will be 1400° F., 0.125 tons of pebbles will be needed per KW installed or 31,200 tons of pebbles for the total plant, plus an excess of 15% to keep the two end sections at constant temperature, for a total of 36,000 tons. There are a significant number of suppliers for ceramic fillings in any desired shape, suitable alumina balls are made by MarkeTech (for example, grades P975 and P965). Special ceramic fillers can also be ordered.

Another option would be to use ready made, e.g., 4-foot diameter steel pipes, and have them prepared in a shop to provide 50 to 100 foot sections coated in the inside with an insulating heat resistant layer, and designed for easy on-site assembly. The pipes can be provided already filled with the proper filling material. This is especially advisable if more than one plant is built. In this example, 700 such pipes, each 100 feet long, would be needed (or, 1200 section, each 60 feet long).

In some high temperature nuclear reactors, the pressure of the helium can reach 70 to 100 atm. At this pressure, large tanks become expensive. A possible solution is to add a secondary circuit of helium at a lower pressure (2.0 to 50 atm, and preferably in the range of 2035 atm) and heat exchange it with the primary circuit. The same applies to any other gaseous heat transfer medium used in the primary circuit. Later when needed, heat from the storage tank can be transferred to the power plant by the secondary circuit in the same manner as described above. This requires a vessel or tank volume of about 24,000 m$^3$ or 0.1 m$^3$/KW.

It is preferable to use several tanks since a single tank of 24,000 m$^3$ is likely too large and not optimal. The number and dimensions of the tanks used in the system HSS will depend on local conditions. While vertical tanks placed in the ground are acceptable when conditions permit, horizontal tanks in which the two end sections are easily available for maintenance may be preferable. Both ends require a distributor and an outlet collection system. There are many proven designs for distribution and collection developed for catalytic reactors which are well-known to those skilled in the art. High L/D ratios are preferable as they promote an even flow distribution, and a good plug flow.

The example herein provides one possible embodiment. The desired volume of 20,000 m$^3$ can be achieved by installing 17 tanks placed horizontally, each 8 meters in diameter and 30 meters long. Each tank will provide 14,750 KW capacity. The heat flowing through one storage tank is 111 million BTU/hr, the temperature drop is 1400° F., and the molar Cp of He is 5.0 moles. Thus, the total flow of He is 20,570 moles/hr or, 5.7 moles/second. In Table 1 we have estimates for a proposed design for this example using a pressure of 30 atm and a tank with a length of 100 feet. It should be noted that the linear velocities are small and the pressure drop and the required re-compression energy for the storage bed is quite small, and for maximum delivery during load following this pressure drop and the compression requirements are acceptable and the storage efficiency is still very high.

Clearly, the total amount of electricity supplied per day cannot exceed 6 GWh/day, i.e., the capacity of the nuclear reactor in the instant example. With 12-hour storage, the maximum feasible output that can be supplied is 1 GW for 4 hours (of which 1 million KWh would come directly from the reactor RC and 3 million KWh from the storage HSS). An additional 2 GWh would have to be dispatched at the rate of 250 MW over a long time period.

The foregoing is an extreme case. In practice, load following up to 500 MW for the entire time desired could be provided by one gigawatt output for shorter periods. With experience, a practical dispatching schedule that allows the system to be used for intermediate loads, peak loads and instantaneously dispatchable energy can be devised, and the system can be designed accordingly. The proposed system maximizes flexibility by using multiple tanks and by allowing for an increase in storage capacity.

It should be apparent that there can be many potential variations in scheduling that fulfill the three constraints of the design: the capacity of the nuclear reactor, the storage supplied, and the size of the steam power plant. With the invention, the response to changes in demand can be as fast as with conventional steam power plants, and the nuclear reactors can always operate steadily at optimum conditions. Detailed cost estimates are not herein discussed, as they strongly depend on the location, timing and the desired load schedule. However, the following hypothetical example will illustrate the potential advantages of the invention.

Consider a 250 MW high-temperature reactor RC cooled with pressurized He and designed with 12 hour heat storage in the system HSS. For simplicity, all costs are based on 1 KW capacity. We assume that the cost of the nuclear reactor complex itself without storage is $2500/KW capacity of which $350 goes for the steam power plants. To operate in intermediate mode, the capacity of the steam power plant SPP must be doubled and this adds $350/KW to the cost. When designed for load following mode, the steam power plant capacity must be increased four-fold, raising the base cost by $1050/KW. The cost of heat storage of the system HSS would be the same in each case.

To store heat for 12 KWh, the storage system HSS need per KW capacity is 0.125 tons of solid media, which requires a storage vessel with a volume of 0.1 m$^3$ per KW at a cost of less than $200, if another $100/KW is added for the cost of the rest of the storage system HSS, the total cost of the heat storage is $300 per KW. This brings the total cost to $3,250 for the total power plant. To increase the capacity four-fold, another $700 should be added for the steam plant SPP. This brings the total cost to $3950/KW of the base plant or about 60% above the cost of the base-load only cost.

To supply 2 KW intermediate load from the same HTR without storage requires two 250 MW power plants. The incremental capital cost would be $2,500 compared to $750 for the storage case. Unlike the instant invention, which includes storage, however, this solution has very little load following capability. Where fast load following is required, however, the ability to produce up to 1 GW (as mentioned above) cannot be matched by any combination of HTRs without storage. Even if this were possible, the cost would be much higher.

The invention described herein places high-temperature nuclear reactors at a substantial economic advantage. Today, their market is limited because they are more expensive to build and operate than water-cooled reactors and, their maximum size is small. In addition to increasing the cost-effectiveness of nuclear reactors for base load, the invention also makes them economically attractive for supplying the variable demands of the grid, which is the major part of the total market for electricity.

It is noted that the forming examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

TABLE 1

Nuclear Plant Design

| Parameter | Value |
|---|---|
| Nuclear Plant Size (MW) | 250 |
| Steam Power Plant Size (MW) | 1000 |
| Heat Transfer Fluid | He |
| Pressure (atm) | 30 |
| $T_{Max}$ (° F.) | 1700 |
| Daily kWh via Storage/kW Installed | 12 |
| Power Plant Efficiency (%) | 42.6 |
| (1 kWh = 8000 Btu) | |

TABLE 2

Design of Storage

| Parameter | Value |
|---|---|
| Storage: Number of Vessels | 17 |
| (Diameter × Length; m × m) | (8 × 30) |
| Solid Filling (mm) | 10 |
| Average Diameter Alumina Particles | |
| Density (kg/m$^3$) | 4000 |
| Bulk Density (kg/m$^3$) | 2400 |
| Velocity in Storage Tank (m/sec) | 0.12 |
| Maximum Velocity in Storage Tank During Load Following (m/sec) | 0.48 |
| Single Pass Pressure Drops in Storage Tank (atm) | 0.024 |
| Maximum Single Pass Pressure Drops in Storage Tank During Load Following (atm) | 0.45 |
| kWh Compression per kWh Generated | 0.0006 |
| Maximum kWh Compression per kWh Generated During Load Following | 0.011 |

What is claimed:

1. A system for storing heat generated in a nuclear power plant, the system comprising at least one tank; wherein the at least one tank contains or is filled with high temperature resistant solids; the high temperature resistant solids comprising at least one of particles and pebbles, the particles and pebbles made of at least one of alumina, silica, quartz, and ceramic; the at least one tank being configured to receive a first fluid in order to transfer and store heat from the first fluid to the high temperature resistant solids; the at least one tank being also configured to receive a second fluid in order to transfer the heat from the high temperature resistant solids to the second fluid;

wherein the at least one tank and the high temperature resistant solids are configured such that heat is absorbed in the high temperature resistant solids and that the heat spreads through the at least one tank in a relatively sharp front; and wherein the relatively sharp front has a width that is less than one tenth of a length of the at least one tank.

2. The system of claim 1, wherein the first fluid comprises a compressed gas.

3. The system of claim 2, wherein the compressed gas comprises helium.

4. The system of claim 1, wherein the second fluid comprises a compressed gas.

5. The system of claim 1, wherein the first fluid comprises a compressed gas moving at a predetermined velocity.

6. The system of claim 1, wherein the first fluid is higher in temperature than the second fluid.

7. The system of claim 1, wherein the first fluid passes through at least one device heated by nuclear fission before entering the at least one tank.

8. The system of claim 1, wherein the second fluid is used to produce steam in a power plant before entering the at least one tank.

9. The system of claim 1, wherein the first fluid comprises a compressed gas passing through at least one nuclear reactor core.

10. The system of claim 1, wherein the second fluid comprises a compressed gas passing through a power plant generating electrical power.

11. The system of claim 1, wherein the solid media comprises:
at least one packed bed of at least one of particles and pebbles.

12. The system of claim 1, wherein the system is structured and arranged to move at least one of the first and second fluids through the at least one tank with at least one of uniform flow distribution and minimal pressure drops.

13. The system of claim 1, wherein the first and second fluids comprise portions of the same compressed gas flowing in a closed system, wherein the portions have different temperatures when entering the at least one tank.

14. The system of claim 1, wherein the first fluid comprises a fluid heated by at least one reactor core before entering the at least one tank and the second fluid comprises a fluid exiting a power plant before entering the at least one tank.

15. A system for storing heat generated in a nuclear power plant, the system comprising:
at least one tank, wherein said at least one tank contains or is filled with high temperature resistant solids; the high temperature resistant solids comprising at least one of particles and pebbles made of at least one of alumina, silica, quartz and ceramic; the at least one tank being configured to receive a first fluid in order to transfer and store heat from the first fluid to the solid media high temperature resistant solids; the at least one tank being also configured to receive a second fluid in order to transfer the heat from the solid media high temperature resistant solids to the second fluid; and a control system controlling at least one of:
when the first fluid is allowed to pass through the at least one tank; and
when the second fluid is allowed to pass through the at least one tank;
wherein the at least one tank and the high temperature resistant solids are configured such that heat is absorbed in the high temperature resistant solids and that the heat spreads through the at least one tank in a relatively sharp front; and
wherein the relatively sharp front has a width that is less than one tenth of a length of the at least one tank.

16. A system for storing heat generated in a nuclear power plant, the system comprising:
at least one tank, wherein said at least one tank contains or is filled with high temperature resistant solids; the high temperature resistant solids comprising at least one of particles and pebbles, the particles and pebbles made of at least one of alumina, silica, quartz, and ceramic; the at least one tank being configured to receive a first fluid in order to transfer and store heat from the first fluid to the solid media high temperature resistant solid; the at least one tank being also configured to receive a second fluid in order to transfer the heat from the solid media high temperature resistant solids to the second fluid; and
a control system controlling at least one of:
when the first fluid is allowed to pass through the at least one tank;
when the first fluid is allowed to bypass the at least one tank;
when the second fluid is allowed to pass through the at least one tank; and
when the second fluid is allowed to bypass the at least one tank;
wherein the at least one tank and the high temperature resistant solids are configured such that heat is absorbed in the high temperature resistant solids and that the heat spreads through the at least one tank in a relatively sharp front wherein the relatively sharp front has a width that is less than one tenth of the at least one tank.

17. A system for storing heat generated in a nuclear power plant, the system comprising:
at least one tank, wherein said at least one tank contains or is filled with high temperature resistant solids; the at least one tank being configured to receive a first fluid in order to transfer and store heat from the first fluid to the solid media high temperature resistant solids; the high temperature resistant solids comprising at least one of particles and pebbles, the particles and pebbles made of at least one of alumina, silica, quartz, and ceramic; the at least one tank being also configured to receive a second fluid in order to transfer the heat from the solid media high temperature resistant solids to the second fluid;
at least one nuclear reactor core heating the first fluid before the first fluid enters the at least one tank;
a steam power plant receiving the heated fluid from the at least one nuclear reactor core under certain conditions and receiving the second fluid from the at least one tank under certain other conditions; and
one or more valves controlling movement of the first and second fluids between the at least one nuclear reactor core, the at least one tank, and the steam power plant; and one or more recycle compressors pressurizing the first and second fluids;
wherein the at least one tank and the high temperature resistant solids are configured such that heat is absorbed in the high temperature resistant solids and that the heat spreads through the at least one tank in a relatively sharp front; wherein the relatively sharp front has a width that is less than one tenth of a length of the at least one tank.

18. The system of claim 17, wherein the first and the second fluid comprises helium.

19. A system for storing heat generated in a nuclear power plant, the system comprising:
at least one tank, wherein said at least one tank contains or is filled with high temperature resistant solids; the high temperature resistant solids comprising at least one of particles and pebbles, the particles and pebbles made of at least one of alumina, silica, quartz, and ceramic; the at least one tank being configured to receive a first fluid in order to transfer and store heat from the first fluid to the solid media high temperature resistant solids; the at least one tank being also configured to receive a second fluid in order to transfer the heat from the solid media high temperature resistant solids to the second fluid; wherein the at least one tank and the high temperature resistant solids are configured such that heat is absorbed in the high temperature resistant solids and that the heat spreads through the at least one tank in a relatively sharp front; wherein the relatively sharp front has a width that is less than one tenth of a length of the at least one tank;
wherein the system has the following three cycles:
a first cycle wherein the first fluid bypasses the at least one tank, flows to a power plant, and returns to at least one reactor core;
a second cycle wherein at least a portion of the first fluid flows through the at least one tank and returns to the at least one reactor core; and
a third cycle wherein the second fluid passes through the at least one tank, flows to the power plant, and returns to the at least one tank.

* * * * *